United States Patent [19]

Muijs et al.

[11] 4,067,343
[45] Jan. 10, 1978

[54] GRAIN CONVEYOR MEANS

[75] Inventors: Cornelis G. M. Muijs, Flagey-Echezeaux, France; Frans J. G. C. Decoene, Zedelgem, Belgium

[73] Assignee: Clayson N. V., Zedelgem, Belgium

[21] Appl. No.: 699,112

[22] Filed: June 23, 1976

[30] Foreign Application Priority Data

June 26, 1975  United Kingdom ............... 27066/75

[51] Int. Cl.² .............................................. A01F 12/60
[52] U.S. Cl. .................................... 130/27 R; 56/16.6; 198/642; 214/519
[58] Field of Search ................. 130/27 R, 27 Z, 27 T, 130/27 AB, 21-26; 56/14.6, 16.6; 198/638, 642, 666; 214/519, 522, 83.32

[56] References Cited

U.S. PATENT DOCUMENTS

| | | | |
|---|---|---|---|
| 2,839,208 | 6/1958 | Hansen | 214/522 |
| 3,348,652 | 10/1967 | Vinyard | 198/642 X |
| 3,348,706 | 10/1967 | Hyman | 214/522 X |
| 3,365,086 | 1/1968 | Young | 214/519 |

FOREIGN PATENT DOCUMENTS

| | | | |
|---|---|---|---|
| 2,058,549 | 6/1971 | Germany | 56/14.6 |
| 2,202,454 | 7/1973 | Germany | 56/16.6 |

Primary Examiner—Jay N. Eskovitz
Attorney, Agent, or Firm—Frank A. Seemar; John B. Mitchell; Joseph A. Brown

[57] ABSTRACT

An improved grain elevator is provided for a combine to transfer clean grain from the cleaning mechanism to a temporary, pivotally mounted, grain holding tank. The grain transfer elevator comprises a generally transversely and horizontally extending first auger disposed below the cleaning mechanism and connected to a second auger which extends upwardly in a transverse inclined direction through the bottom wall of the grain tank to a position at the top middle of the tank for discharging clean grain therein. The second auger includes separate parts releasably coupled together to thereby permit disengagement thereof for allowing the grain tank to be tipped for unloading.

11 Claims, 7 Drawing Figures

GRAIN CONVEYOR MEANS

BACKGROUND OF THE INVENTION

1. Field of the Invention

The present invention relates to harvesting machines and more particularly to conveyor means employed on such machines.

While the terms "grain" and "straw" are used principally throughout this specification for convenience, it should be understood that the terms are not intended to be limiting. Thus "grain" refers to that part of the crop material which is threshed and separated from the discardable part of the crop material which is referred to as "straw".

2. Description of the Prior Art

Conventional combine harvesters have a header and an elevator for harvesting standing crop and conveying the same to a threshing and separating mechanism for threshing and separating grain from the discardable crop material. The separated grain, together with impurities of all kind, such as chaff, dust, straw particles and tailings, are collected on a grain pan and conveyed to a cleaning mechanism comprising cleaning sieves and a cleaning fan. The cleaning mechanism is operable to discharge chaff, dust, straw particles, and the like, onto the ground and to collect the tailings in a tailings collecting mechanism and the clean grain in a clean grain collecting mechanism. The tailings are either recycled through the threshing and separating mechanism via a tailings elevator, or treated in a separate tailings re-threshing means. The clean grain is conveyed into a grain tank on top of the machine, via a grain elevator, for temporary storage. The grain elevator is normally a paddle-type elevator which extends from below and adjacent the discharge end of the clean grain collecting means in the cleaning mechanism and extends in an upward direction alongside the combine frame and often also alongside the grain tank to the top thereof or even to a location thereabove. At this upper end, the grain elevator is connected to grain distributing means extending generally transversely of the grain tank. As the grain elevator extends alongside one side of the machine frame and the grain tank, any necessary inclination can be given thereto to accommodate any fore-and-aft displacement of the grain tank relative to the cleaning mechanism without interfering with any other components of the machine.

Nowadays, there is a constant trend to increase the capacity of a combine harvester and more particularly of the grain tank. Increasing the width of the grain tank is primarily limited by road regulations imposed on all kinds of vehicles, including combine harvesters. A typical maximum permitted width is three meters. Therefore, it has already been suggested to provide a grain tank with a width of three meters. This means that, rather than providing the grain elevator alongside the grain tank side wall, it has to extend through the bottom wall and inside the grain tank. Moreover, due to the large size of such grain tanks it has become rather difficult fully and evenly to load the tanks and hence to utilize their maximum capacity with the conventional grain elevator and distributing means.

SUMMARY OF THE INVENTION

As disclosed and claimed in our co-pending U.S.A. patent application Ser. No. 699,114, the conventional, fixed grain tank is replaced by a larger, low profile tippable grain tank. When seen in top view, this grain tank has an extremely large surface area which means that the aforementioned drawback of conventional elevators and distributing means is particularly critical in combination with such a grain tank.

Also disclosed in the aforementioned co-pending application, is the replacement of the conventional straw walkers by transversely-extending, rotary type separator means. The outer ends of the separator means extend beyond the respective outer ends of the threshing means and at a location where in conventional combine harvesters the grain elevator is provided. Preferably, the width of the rotary separator means is the maximum allowable. This also means that the conventional elevator means could not be employed in such a combine harvester since it would interfere with the separator means. In order to avoid this interference, the elevator would have to be provided at a location rearwardly of the separator means which would result in the lower receiving end of the grain elevator being positioned at a distance from the discharge end of the grain collecting means. Therefore, special transition means would have to be provided between the discharge end of the grain collecting means and the receiving end of the elevator.

According to the present invention, a harvesting machine comprises a first conveyor, a second conveyor disposed at an angle relative to the first conveyor, and transition means joining the first conveyor to the second conveyor, the transition means comprising a first impeller associated with the discharge end of the first conveyor and operable to receive crop material from the first conveyor and transfer it to a second impeller associated with the inlet of the second conveyor and operable to transfer crop material received from the first impeller to the second conveyor.

Preferably, the first conveyor is of the auger type and extends generally horizontally and transversely of the machine at a location below cleaning means of the machine and having its discharge end at one side of the machine. The second conveyor may be in the form of an elevator extending to a location above the middle of the grain tank on top of the machine and inclined in a transverse direction. Rather than being of the paddle-type, as on most conventional combine harvesters, the elevator is preferably of the auger type and may extend through the bottom wall of the grain tank. The second conveyor may be arranged in two parts joined by coupling means at the bottom wall of the grain tank, which coupling means are disengageable to allow the grain tank to tip for unloading.

The receiving end of the second conveyor or elevator may be spaced in a rearward direction from the discharge end of the transversely extending grain collecting auger or first conveyor and the transition means bridge the gap between the two. Preferably, the first impeller is formed by a pair of radially extending impeller blades which are mounted on the auger shaft of the first conveyor at its discharge end and which are arranged in a housing having a discharge opening which is connected to another housing. The latter housing has a second impeller mounted therein which again may be formed by a pair of impeller blades mounted on a rotary shaft extending parallel to the auger shaft of the elevator forming the second conveyor. The elevator auger, as well as both said impellers may be driven from the grain collecting auger via a simple drive arrangement.

IN THE DRAWINGS

A combine harvester embodying the present invention will now be described in further detail, by way of example, with reference to the accompanying drawings, in which.

DESCRIPTION OF THE PREFERRED EMBODIMENT

Figure 1:
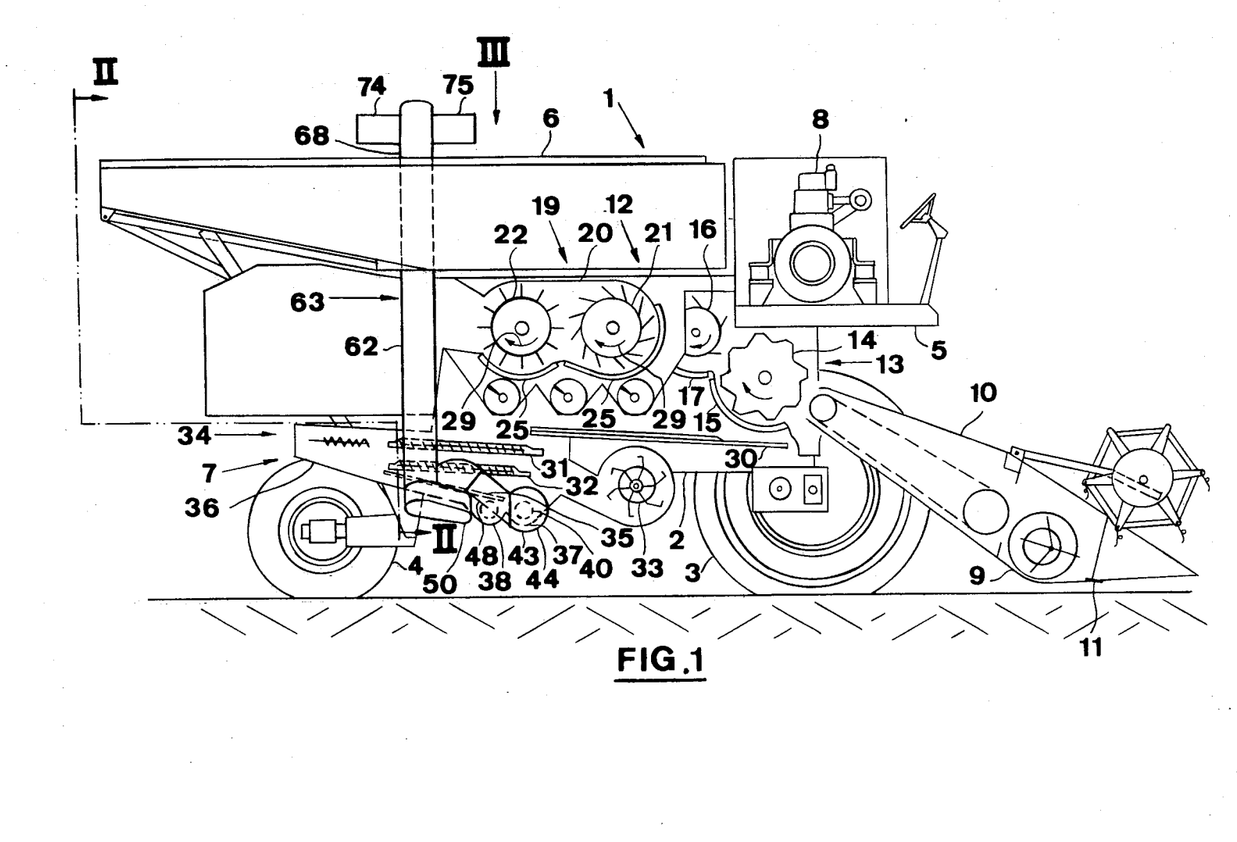
FIG. 1 is a schematic side view of the combine harvester.
Figure 2:
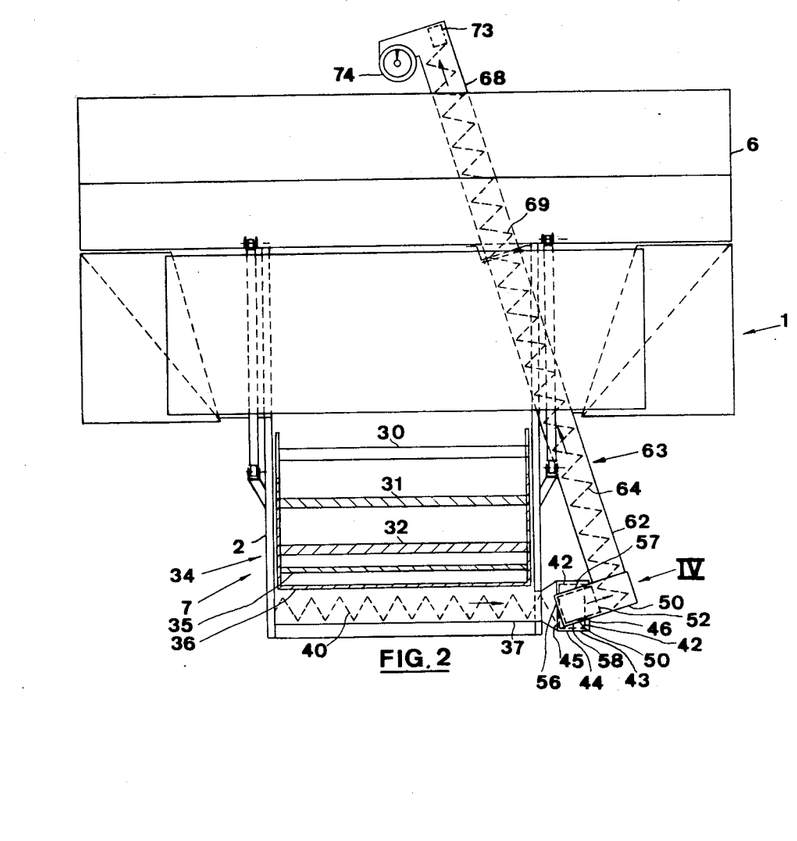
FIG. 2 is a schematic rear view taken in the direction of arrow II in FIG. 1.
Figure 3:
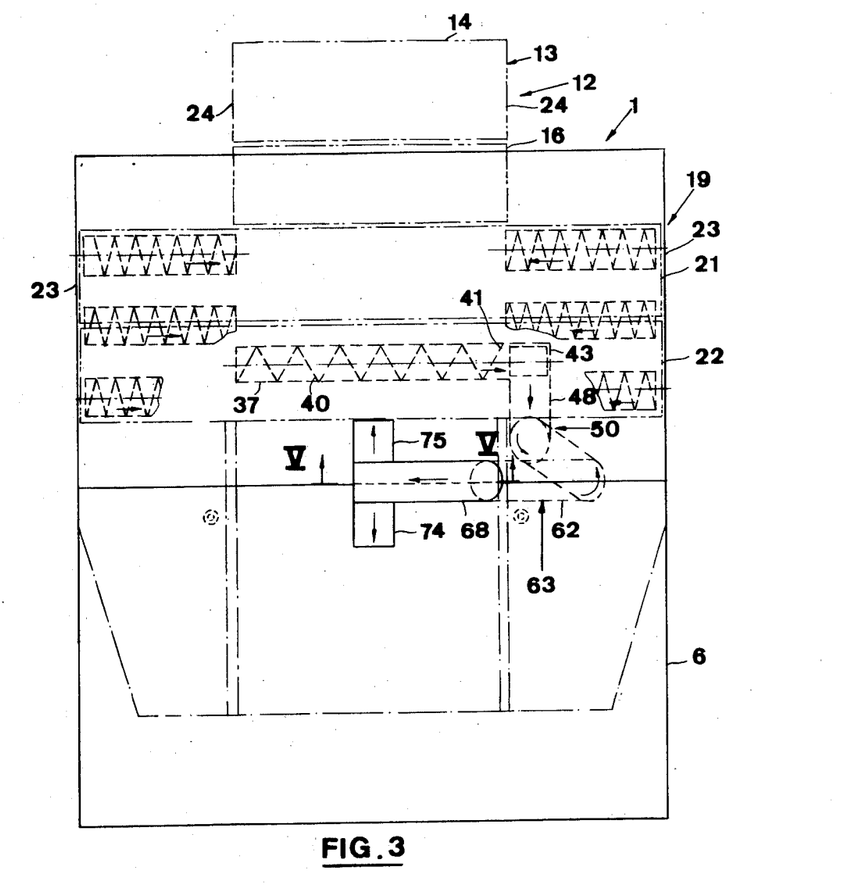
FIG. 3 is a schematic top view taken in the direction of arrow III in FIG. 1.
Figure 4:
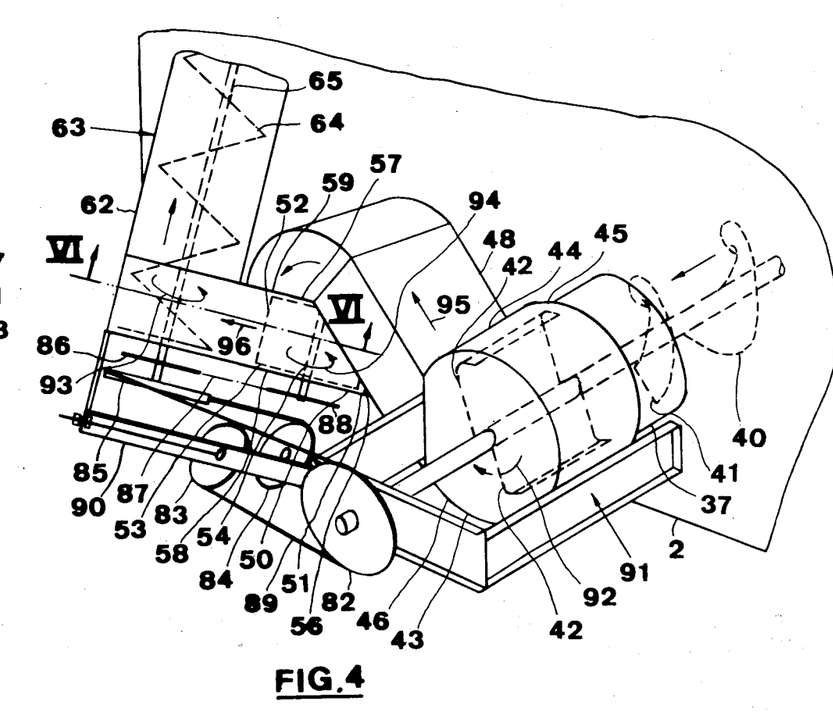
FIG. 4 is a schematic perspective view taken in the direction of arrow IV in FIG. 2, FIGS. 5a and 5b are partial sectional views along the line V—V in FIG. 3.
Figure 5A:
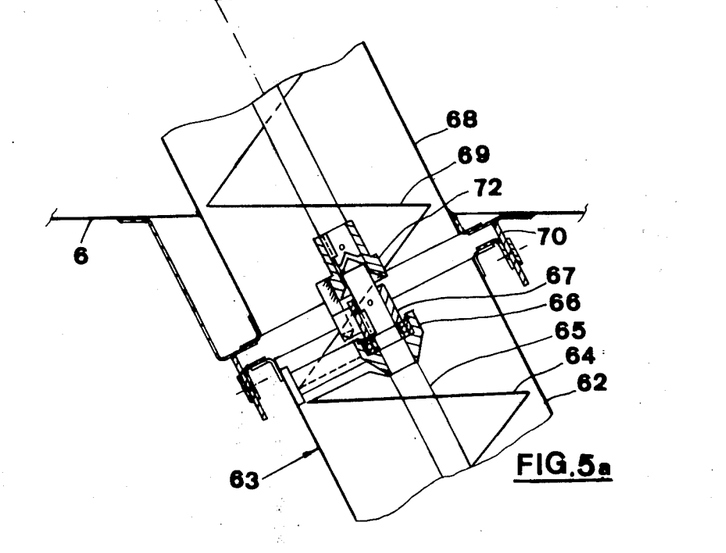
Figure 5B:
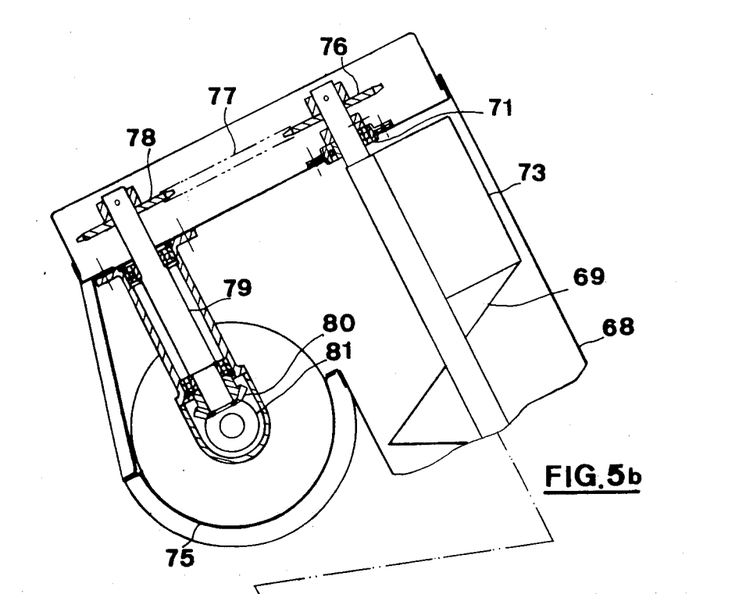
Figure 6:
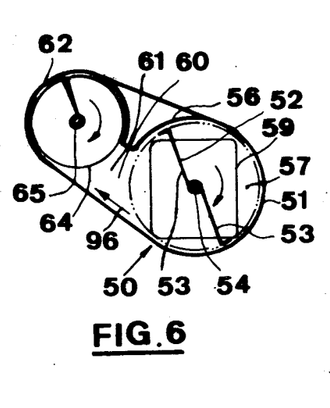
FIG. 6 is a sectional view along the line VI — VI of FIG. 4.

With reference to FIG. 1, the combine havester embodying the present invention is generally indicated at 1 and comprises a main frame or chassis 2 supported on a pair of drive wheels 3 and a pair of steerable wheels 4 (only one wheel of each pair being shown). Supported on the main frame 2 are an operator's platform 5, a grain tank 6, a grain cleaning mechanism 7 and an engine 8. A conventional header 9 and a feed conveyor 10 extend forwardly of the machine. The main frame also supports a threshing and separating mechanism which is generally indicated at 12. The threshing portion 13 of the mechanism 12 comprises a conventional rotatable thresher cylinder 14 cooperable with a conventional stationary thresher concave 15, the operation of which is generally known in the art. Rearwardly of the thresher cylinder 14 and the thresher concave 15 there is provided a conventional deflector or so-called straw beater 16 with a cooperable grate 17. The straw beater 16 and grate 17 are of substantially the same width as the threshing mechanism 13 and are arranged behind the latter in a manner to receive the straw mat resulting from the threshing mechanism.

Rearwardly of the straw beater 16 a separating mechanism 19 is provided which comprises a single casing or housing 20 having two transversely-extending rotors 21, 22 mounted therein. The width of the separating mechanism 19 substantially exceeds the width of the threshing mechanism 13 but the plane of symmetry of the former coincides with the plane of symmetry of the latter, whereby the outer ends 23 of the separating mechanism 19 extend past the respective ends 24 of the threshing mechanism 13. Preferably, the separating mechanism 19 has a width of three meters.

The transversely-extending separating rotors 21, 22 are arranged in parallel, one behind the other, inside the casing 20 part of which is defined by separator concaves 25. The rotors 21, 22 are driven in the same direction 29 and comprise crop-treating and crop conveying elements cooperable with the separating concaves 25 and operable in use to separate grain from the straw while conveying approximately half the straw mat in a first spiral path around both rotors 21, 22 at the inner side of said casing 20 to one end of the separator mechanism 19 for discharge, and the remainder of the straw mat in the opposite spiral path and around both rotors 21, 22 to the opposite end for discharge. For a further detailed description of the threshing and separating means 12 and the operation thereof, reference is made to our co-pending Canadian patent application Ser. No. 203,582, respectively U.S. Pat. No. 3,946,746 which claim other features of the illustrated embodiment.

As the combine 1 is propelled forwardly over a field, the crop material to be harvested is severed from the stubble by a sickle bar 11 on the header 9 and is conveyed by the header 9 and the feed conveyor 10 to the threshing and separating mechanism 12. The crop material received within the threshing and separating mechanism 12 is threshed, that is to say the crop material (which may be wheat, corn, rice, soybeans, rye, rapeseed, barley, or other similar crop materials) is rubbed and beaten whereby the grain, seed, etc. is loosened and separated from the straw stalks, coils, or other discardable part of the crop material. The grain which has been separated from the straw in the threshing and separating mechanism 12 falls onto the grain cleaning mechanism 7 which includes means to separate chaff from the grain and means to separate unthreshed material (known in the art as tailings) from the grain. The clean grain is then elevated to the grain tank 6 and the tailings are returned to the threshing and separating mechanism 12.

With particular reference to FIG. 2 to 6, grain conveyor means extending between the cleaning mechanism 7 and the grain tank 6 will now be described in further detail.

The cleaning mechanism 7 comprises a grain pan 30 for collecting grain separated in the threshing and separating mechanism 12, cleaning sieves 31, 32 located rearwardly thereof, and a cleaning fan 33 disposed forwardly of the sieves 31, 32 and below the grain pan 30. The cleaning sieves 31, 32 are arranged in a reciprocating cleaning shoe 34 which further also comprises a forwardly- and downwardly-inclined clean grain collecting chute 35 and a tailings collecting chute 36 as is known in conventional combine harvesters. The clean grain collecting chute 35 is arranged to discharge collected clean grain in an auger trough 37 while the tailings collecting chute 36 is arranged to discharge collected tailings in an auger trough 38. The tailings are further processed in a manner generally known in the art, which process need not be described in detail since it forms no part of the present invention.

The auger trough 37 extends transversely of the combine below the cleaning means 7 and contains an auger 40 and has a discharge end 41 adjacent one side of the cleaning mechanism 7 to which collected grain is conveyed. The clean grain auger 40 supports at its discharge end a pair of impeller blades 42 which are arranged inside an impeller housing 43 comprising a cylindrical wall 44 and flat side walls 45, 46 extending generally vertically and in fore-and-aft direction. The width of the casing is substantially equal to that of the impellers 42.

The cylindrical wall 44 has a rearwardly facing discharge opening which is connected to a tangential, upwardly-directed duct 48 having itself a discharge end facing downwardly and connected to a second impeller structure 50 comprising a housing 51 with an impeller 52 mounted therein. The impeller 52 comprises impeller blades 53 mounted on a shaft 54 which is inclined upwardly and inwardly of the machine and defines thereby an acute angle with the auger 40.

The impeller housing 51 comprises a cylindrical wall 56 and an upper and lower flat wall 57, 58, positioned adjacent the side edges of the impeller blades 53. The housing 50 has an inlet opening 59 in the upper wall 57 which is connected to the discharge opening of the duct 48, and a tangential discharge opening 60 in its cylindrical wall 56 which connects with a tangential inlet opening 61 of an elevator 63 comprising an auger tube 62. The elevator 63 further comprises an elevating auger 64 on the auger shaft 65. The auger tube 62 with the auger 64 therein extends generally upwardly and is inclined slightly inwardly of the combine in a transverse direction. The auger shaft 65 is supported at its lower end in a bearing (not shown) and at its upper end in a bearing 66.

A further elevator comprising an auger tube 68 with an auger 69 mounted therein is arranged inside the grain tank 6 and when the latter is in the horizontal grain loading position, then the auger tube 68 is aligned with the auger tube 62, the two being detachably coupled together by coupling means 67, 72. The lower auger tube 62 comprises sealing means 70 at its upper end which are in sealing contact with the lower end of the upper auger tube 68 when the graintank is in its normal horizontal position. The auger 69 is supported in a bearing 71 at its upper end and which enables minor angular adjustments of the auger section 69. The discharge end of the auger 69 is located at a position generally above the middle of the grain tank 6 and comprises at this end a discharge vane 73. Fore-and-aft extending distributing augers 74, 75 are provided adjacent the discharge end of the upper auger 69 and are arranged to receive grain from the discharge vane 73 and spread the same substantially evenly in the grain tank 6.

The augers 74, 75 are driven from the auger 69 via a chain and sprocket transmission 76, 77, and 78, an intermediate shaft 79, and a conical gear transmission 80, 81. The clean grain auger 40 supports a pulley 82 at its end provided with the impellers 42 and a further pulley 85 is mounted on the lower end of the auger shaft 65 of the elevator auger 64. A belt 89 is provided around the pulleys 82, 85 and around two tension pulleys 83, 84, which are mounted at an angle on the sub-frame 90. The auger shaft 65 also supports a sprocket 86 for driving the impeller 52 via a chain 87 and a further sprocket 80. The impeller shaft 54 is inclined in an upward and inward direction and extends parallel to the auger shaft 65. Thereby, the pulleys 82 and 85 are inclined relative to each other. This angular displacement is accommodated in the drive transmission there-between by the belt 89 and the inclined pulleys 83, 84. The discharge end 41 of the clean grain auger 40 and the receiving end of the elevator 63 are spaced from each other in fore-and-aft direction and transversely, and the gap therebetween is bridged by the above described transition means in the form of impellers 42, 52 and the housings and duct associated therewith.

OPERATION

In operation, the clean grain auger 40 and the impeller blades 42 are driven as indicated at 92 and hence the elevator auger 64 and impeller 52 are driven in a direction as indicated at 93 and 94, respectively. The clean grain collected in the clean grain auger trough 37 is fed to the impellers 42 by the auger 40. The impeller 42 impels the clean grain in a tangential direction 95 through the duct 48 to the impeller 52 through the inlet opening 59. Since the inlet opening 59 is in the top of the housing 50, the grain falls to the impeller 52 which helps to prevent jamming. The impeller 52 further impels the clean grain in a tangential path 96 to the inlet 61 of the elevator auger 64 which in turn feeds the grain to the grain tank 6.

The conveyor means according to the present invention are a simple, and hence a relatively inexpensive structure, since all components of the transition means are primarily made of sheet metal, (housings and impellers). Also, the first impeller 91 is mounted on the clean grain auger 40 whereby no special bearings and drive means for this impeller are required. Furthermore, the second impeller 52 is an equally inexpensive structure and only requires the addition of a simple shaft 54 with associated bearings and of a very simple drive 86, 87, 88, as the impeller shaft 54 extends parallel to the elevator auger shaft 65 and is driven in the same direction. Also, as the elevator 63 is of the auger-type as opposed to the conventional paddle-type, this elevator is cheaper. Indeed, the expensive chain for mounting the paddles thereon has been replaced by a relatively cheap auger structure.

The provision of transition means according to the invention permits the elevator inlet 61 to be spaced rearwardly relative to the discharge end 41 of the clean grain auger 40, i.e. rearwardly the separating mechanism 19. Thus, it has also become possible to provide the elevator auger tube 62 at the location rearwardly and inwardly of the separator mechanism 19 and with an inclination in a transverse direction so that the elevator tube 62 extends along an inner side edge of one discharge opening of the separating means 19 to a location generally above the middle of the grain tank 6. Hence the elevator 63 does not interfere with the operation of the separating mechanism 19 or increase the overall width of the combine. Also, it has become possible to load the grain tank 6 more evenly and fully so as to use its maximum capacity.

As the elevator 63 is formed by two augers detachably coupled together at the base of the grain tank 6, it is possible to provide a large size, low profile grain tank which can be tipped or pivoted to discharge grain contained therein. Also, the grain tank 6 has the maximum allowable width for transportation on public roads (typically 3 meters) since the elevator is no longer provided alongside the grain tank unlike known combine harvesters. Furthermore, while the discharge end 41 of the clean grain auger 40 and the inlet 61 of the elevator 63 are positioned at spaced locations, a very fluent and positive transfer of grain between the two is achieved by the above-described transition means in the form of the first and second impellers 42, 53. It is particularly advantageous that the impellers 42, 53 each discharge grain tangentially to the next component.

We claim:

1. An agricultural harvesting machine comprising:
   a. a chassis adapted to travel across a field;
   b. first conveyor means for conveying crop material from the field to the chassis;
   c. threshing, separating and cleaning means mounted to the chassis for threshing and separating crop material and for cleaning the threshed and separated crop material;
   d. second conveyor means associated with the cleaning means, said second conveyor means being of the auger type with an auger flight mounted on an auger shaft and which extends generally horizontally and transversely of the machine at a location below the grain cleaning means and has a discharge end at one side of the machine and is operable to collect clean grain from the cleaning means and to convey the clean grain to its discharge end;

e. third conveyor means mounted to the chassis and disposed at an angle relative to the second conveyor means; and f. transition means joining the second conveyor means to the third conveyor means, the transition means comprising:

1. a first impeller means associated with the discharge end of the second conveyor means and operable to receive crop material from the second conveyor means, said first impeller means including an impeller casing of generally cylindrical shape with generally slat side walls and having a generally axial inlet opening and a generally circumferential discharge opening and at least one impeller blade contained within the impeller casing and mounted on the auger shaft of the second conveyor means adjacent its discharge end, the impeller being adapted to receive crop material generally axially from the second conveyor means and to discharge the crop material substantially tangentially through said discharge opening; and 2. a second impeller means associated with the inlet of the third conveyor means and operable to receive crop material from the first impeller means and to transfer crop material received from the first impeller means to the third conveyor means.

2. An agricultural harvesting machine comprising:

a. a chassis adapted to travel across a field;

b. first conveyor means for conveying crop material from the field to the chassis;

c. threshing, separating and cleaning means mounted to the chassis for threshing and separating crop material and for cleaning the threshed and separated crop material;

d. second conveyor means associated with the cleaning means, said second conveyor means being of the auger type with an auger flight mounted on an auger shaft and which extends generally horizontally and transversely of the machine at a location below the grain cleaning means and has a discharge end at one side of the machine and is operable to collect clean grain from the cleaning means and to convey the clean grain to its discharge end;

e. third conveyor means mounted to the chassis and disposed at an angle relative to the second conveyor means; and f. transition means joining the second conveyor means to the third conveyor means, the transition means comprising:

1. a first impeller means associated with the discharge end of the second conveyor means and operable to receive crop material from the second conveyor means, said first impeller means including an impeller casing of generally cylindrical shape and having a generally axial inlet opening and a generally circumferential discharge opening and being mounted to the chassis generally coaxially with the auger shaft of the second conveyor auger adjacent the discharge end thereof and a pair of impeller blades contained within the impeller casing and mounted on the auger shaft of the second conveyor means and extending generally radially therefrom and adapted to receive crop material generally axially from the second conveyor means and to discharge the crop material substantially tangentially through said discharge opening; and 2. a second impeller means associated with the inlet of the third conveyor means and operable to receive crop material from the first impeller means and to transfer crop material received from the first impeller means to the third conveyor means.

3. An agricultural harvesting machine as described in claim 2 wherein the casing containing the impellers is of a width substantially equal to that of the impellers.

4. An agricultural harvesting machine comprising:

a. a chassis adapted to travel across a field;

b. first conveyor means for conveying crop material from the field to the chassis;

c. threshing, separating and cleaning means mounted to the chassis for threshing and separating crop material and for cleaning the threshed and separated crop material;

d. second conveyor means associated with the cleaning means, said second conveyor means being of the auger type with an auger flight mounted on an auger shaft and which extends generally horizontally and transversely of the machine at a location below the grain cleaning means and has a discharge end at one side of the machine and is operable to collect clean grain from the cleaning means and to convey the clean grain to its discharge end;

e. third conveyor means mounted to the chassis and disposed at an angle relative to the second conveyor means; and f. transition means joining the second conveyor means to the third conveyor means, the transition means comprising:

1. a first impeller means associated with the discharge end of the second conveyor means and operable to receive crop material from the second conveyor means, said first impeller means including an impeller casing of generally cylindrical shape with generally flat side walls and having an inlet opening in one side wall and a generally circumferential discharge opening connected to the inlet opening of the third conveyor means and having an axis generally parallel to the inclination of the third conveyor means, an impeller shaft rotatably mounted coaxially within said impeller casing, and at least one impeller blade mounted to the impeller shaft and adapted to receive crop material from the first impeller means and to transfer said crop material to the third conveyor means substantially tangentially through said circumferential discharge opening; and 2. a second impeller means associated with the inlet of the third conveyor means and operable to receive crop material from the first impeller means and to transfer crop material received from the first impeller means to the third conveyor means.

5. An agricultural harvesting machine as described in claim 4 wherein the inlet opening in the impeller casing of the second impeller is provided in its top flat side wall and wherein the machine further comprises a transfer duct between the first and second impellers, the transfer duct having a downwardly facing discharge opening which is coupled to said inlet opening in the impeller casing of the second impeller.

6. An agricultural harvesting machine comprising:
a chassis adapted to travel across a field,
conveyor means for conveying crop material from the field to the chassis,
threshing, separating and cleaning means mounted to the chassis for threshing and separating grain from the crop material and for cleaning the threshed and separated grain,
a grain tank mounted to the chassis for temporarily holding cleaned grain therein, and
grain transfer means extending between the cleaning means and the grain tank for transferring cleaned grain from the cleaning means to the grain tank, the grain transfer means comprising:
 a first auger means having an auger flight mounted on an auger shaft and extending in an auger trough, said auger means extending generally horizontally and transversely of the machine at a location below the cleaning means and having a discharge end at one side of the machine, and operable to collect clean grain from the cleaning means and to convey the clean grain to its discharge end,
 elevator auger means having a lower receiving end and an upper discharge end, the lower receiving end being spaced from the discharge end of the first auger means and being located at one side of the machine, and the discharge end of the elevator auger means disposed at a location generally above the middle of the grain tank,
 a first impeller casing of generally cylindrical shape having a generally axial inlet opening and a generally circumferential discharge opening and being mounted generally coaxially with the auger shaft of the first auger means adjacent the discharge end thereof,
 at least one impeller blade contained within the first impeller casing and mounted to said auger shaft,
 a second impeller casing of generally cylindrical shape with an upper inlet opening and a generally circumferential discharge opening being coupled to the receiving end of the elevator auger means and having an axis generally to the elevator auger means,
 at least one impeller blade rotatably mounted within said second impeller casing, and
 a connecting duct extending upwardly from the discharge opening of the first impeller casing and having a downwardly facing discharge opening coupled to the inlet opening of the second impeller casing,
 the first auger means being operable to transfer grain to the first impeller casing, the impeller blade contained therein being operable to impel grain substantially tangentially relative to said first impeller casing into said connecting duct and in downward direction into the second impeller casing, the impeller blade contained in said second impeller casing being operable to feed grain generally tangentially relative to the second impeller casing to the elevator auger means and the elevator auger means being operable to feed grain received from the impeller blade in the second impeller casing into the grain tank.

7. An agricultural harvesting machine as described in claim 6 wherein the elevator auger means are inclined in a transverse direction relative to the machine.

8. An agricultural harvesting machine as described in claim 6 wherein the impeller blade in the second impeller casing is operable to feed the grain substantially tangentially to the receiving end of the elevator auger means.

9. An agricultural harvesting machine as described in claim 6, wherein the separating means is of the rotary type comprising:
 a separating casing disposed transversely of the machine,
 a separating rotor disposed within the separating casing and operable to separate grain from the crop material received from the threshing means, and
 the elevator auger means being disposed at a location rearwardly of and within the ends of the separating means.

10. An agricultural harvesting machine as described in claim 6, wherein the separating means is of the rotary type comprising:
 a separating casing disposed transversely of the machine, the ends of the casing extending past the respective ends of the threshing means and the separating casing having discharge openings adjacent its ends,
 a separating rotor disposed within the separating casing and operable to separate grain from the crop material received from the threshing means and to divide the mat of crop material into two, conveying one part in a spiral path to one side of the machine and conveying the other part in a spiral path to the opposite side of the machine for discharge through the respective discharge openings in the casing, and
 the elevator auger means being disposed rearwardly of the separating casing and in between the respective discharge ends.

11. An agricultural harvesting machine as described in claim 6, further comprising a drive transmission between the first auger means and the elevator auger means for the first auger means to drive the elevator auger means, and a further drive transmission between the elevator auger means and the impeller blade in the second impeller casing for driving the impeller blade in unison with the elevator auger means.

* * * * *